United States Patent
Barr

[11] Patent Number: 5,313,790
[45] Date of Patent: May 24, 1994

[54] ENDOTHERMIC FLUID BASED THERMAL MANAGEMENT SYSTEM

[75] Inventor: Kevin P. Barr, Torrance, Calif.

[73] Assignee: AlliedSignal Inc., Morris Township, Morris County, N.J.

[21] Appl. No.: 992,951

[22] Filed: Dec. 17, 1992

[51] Int. Cl.$^5$ .............................................. F02C 3/20
[52] U.S. Cl. .................................. 60/267; 60/39.462; 60/736
[58] Field of Search ............... 60/266, 267, 39.12, 60/39.462, 736

[56] References Cited

U.S. PATENT DOCUMENTS

| | | |
|---|---|---|
| 2,660,032 | 11/1953 | Rosenthal . |
| 2,839,892 | 6/1958 | Rosenthal . |
| 2,941,372 | 6/1960 | Taylor . |
| 3,067,594 | 12/1962 | Bland et al. . |
| 3,167,913 | 2/1965 | Muhlberg et al. ............... 60/39.02 |
| 3,188,961 | 6/1965 | Scruggs et al. . |
| 3,198,710 | 8/1965 | Long . |
| 3,263,414 | 8/1966 | Herbst . |
| 3,273,332 | 9/1966 | Poudrier . |
| 3,305,319 | 2/1967 | Kowalick et al. . |
| 3,334,486 | 8/1967 | Scholz ........................... 60/39.02 |
| 3,438,602 | 4/1969 | Noddings et al. . |
| 3,478,528 | 11/1969 | McCully . |
| 3,690,100 | 9/1972 | Wolf et al. ..................... 60/267 |
| 3,733,826 | 5/1973 | Wolf et al. ..................... 60/267 |
| 3,929,305 | 12/1975 | Sabol . |
| 4,020,632 | 5/1977 | Coffinberry et al. . |
| 4,099,931 | 7/1978 | Bryant et al. . |
| 4,505,124 | 3/1985 | Mayer . |
| 4,741,152 | 5/1988 | Burr et al. . |
| 4,776,536 | 10/1988 | Hudson et al. . |
| 4,811,556 | 3/1989 | Lau et al. ....................... 60/206 |
| 4,841,723 | 6/1989 | Lau et al. ....................... 60/267 |
| 5,121,598 | 6/1992 | Butler . |
| 5,125,793 | 6/1992 | MacArthur et al. ............. 415/114 |
| 5,149,018 | 9/1992 | Clark . |
| 5,161,365 | 11/1992 | Wright ............................ 60/736 |
| 5,176,814 | 1/1993 | Spadaccini et al. ............ 244/117 R |

FOREIGN PATENT DOCUMENTS 63120826 11/1986 Japan .
2-112631 4/1990 Japan .

OTHER PUBLICATIONS

"How to Use Fuel as a Heat Sink", By G. L. Roth and O. L. Williamson, Publication: Space Aeronautics, Mar. 1960.

*Primary Examiner*—Louis J. Casaregola
*Attorney, Agent, or Firm*—Jerry J. Holden; Robert A. Walsh

[57] ABSTRACT

A thermal management system for a propulsion engine of a supersonic or hypersonic aircraft is provided that uses a single flow of endothermic fluid as engine fuel and as a heat sink for engine cooling. The system includes a plurality of heat exchangers in flow series arrangement. Each heat exchanger has a reactor portion, containing a catalyst, in heat exchange relation with a heat source portion. The single fluid flow flows through each of the reactor portions and heat source portions. The heat for the reaction in the reactor portions is provided by the fluid in the heat source portion which as a result is cooled. This cooled fluid is then reheated by flowing it past a hot portion of the engine after which the fluid can flow to another reactor portion or to the engine's combustor where it is ignited.

6 Claims, 1 Drawing Sheet

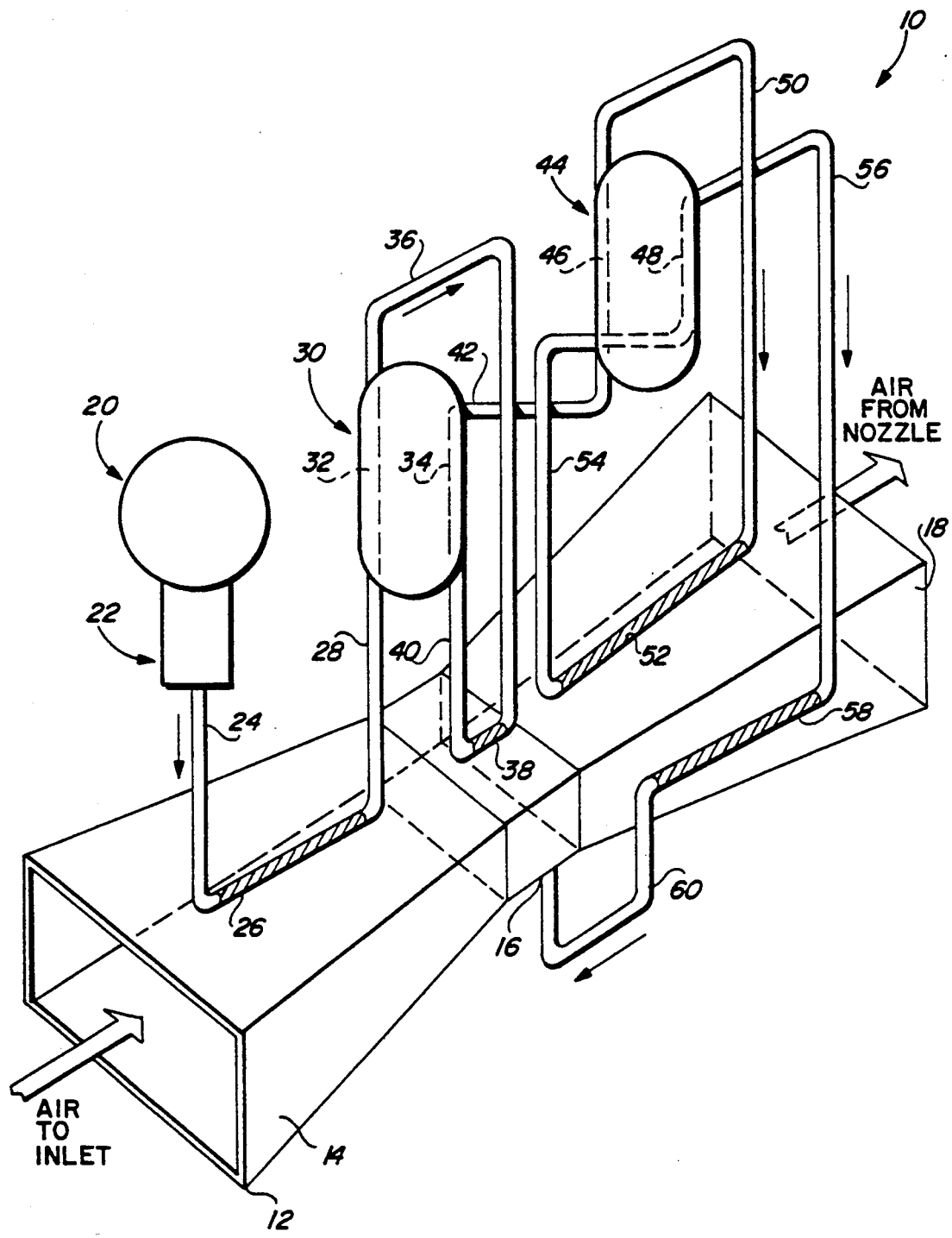

ENDOTHERMIC FLUID BASED THERMAL MANAGEMENT SYSTEM

TECHNICAL FIELD

This invention relates to a thermal energy management system for cooling engine components of supersonic and hypersonic aircraft in which a single flow of an endothermic fluid is used as the heat sink as well as fuel for the engine.

BACKGROUND OF THE INVENTION

Thermal management systems are used to cool components, such as turbine blades, in aircraft propulsion engines. For aircraft operating at Mach 3 or less these systems employ bleed air from the engine as the heat sink. As the aircraft exceeds Mach 3, the air stagnation temperature, in the engine, rises rapidly rendering the bleed air ineffective as a heat sink. An obvious alternate heat sink is the engine's fuel. However, the relatively low thermal stability temperature of conventional jet engine fuels limits their heat sink capability to temperatures at which they begin to coke. This coking temperature is about 450° K. (350° F.) for Jet Propellant(JP)-4 and about 650° K. (700° F.) for JP-7. In aircraft operating at speeds greater than Mach 3, the temperature of the engine's components can easily exceed these limits. In such cases the fuel cannot be used directly for cooling but instead must be used to cool bleed air or some other stable fluid in an intermediate cooling loop. The intermediate cooling loop requires, for safety reasons, buffered heat exchangers which have a buffer space between the fuel and the bleed air which needs to be monitored for leaks of either fuel or oxidant.

Endothermic fuels are fluids which with the addition of heat and in the presence of a catalyst decompose into two, or more, gaseous compounds at least one of which is combustible. Because of their sensible and latent heat capacities and their endothermic chemical reaction energy absorbtion mechanism, endothermic fuels have higher heat sink capabilities than Jet Propellants.

Accordingly, for aircraft operating at speeds greater than Mach 3, there is a need for an engine thermal management system that uses an endothermic fluid as a heat sink and as fuel for the engine.

SUMMARY OF THE INVENTION

An objective of the present invention is to provide an engine thermal management system for a propulsion engine mounted in an aircraft capable of supersonic and hypersonic flight.

Another objective of the present invention is to provide an engine thermal management system that uses a single flow of an endothermic fluid as engine fuel and as a heat sink for engine cooling.

Yet another objective of the present invention is to provide an engine thermal management system that does not require intermediate cooling loops.

Yet still another objective of the present invention is to provide a method in which a single flow of an endothermic fluid is used to fuel and cool a propulsion engine.

The present invention achieves these objectives by providing a thermal management system for a propulsion engine that uses a single flow of an endothermic fluid as engine fuel and as a heat sink for engine cooling. The system includes a plurality of heat exchangers in flow series arrangement. Each heat exchanger has a reactor portion containing a catalyst in heat exchange relation with a heat source portion. The single fluid flow flows through each of the reactor portions and heat source portions. The heat for the reaction in the reactor portions is provided by the fluid in the heat source portion which as a result is cooled. This cooled fluid is then reheated by flowing it past a hot portion of the engine. After exiting the last heat exchanger, fluid is delivered to the engine's combustor where it is ignited.

These and other objects, features and advantages of the present invention are specifically set forth in or Will become apparent from the following detailed description of a preferred embodiment of the invention when read in conjunction with the accompanying drawing.

BRIEF DESCRIPTION OF THE DRAWINGS

The sole figure is a schematic of the thermal management system contemplated by the present invention in conjunction with a propulsion engine.

DESCRIPTION OF THE PREFERRED EMBODIMENT

Referring to the drawing, a thermal management system generally denoted by reference numeral 10 is shown in conjunction with a propulsion engine 12. For illustrative purposes, the propulsion engine 10 is shown as a scramjet. However, the configuration of the engine 12 can be any one of a plurality of engine configurations such as, but not limited to, a turbojet, a ramjet, a turboramjet, or a combined cycle engine. The propulsion engine 12 is comprised of, in a flow series arrangement, a diffuser 14, a combustor 16, and a nozzle 18.

The thermal management system 10 includes a fuel tank 20 having an endothermic fuel, as a low pressure liquid, stored therein. A pump 22 pressurizes the fuel to a sufficient pressure to satisfy the pressure requirement of the fuel injectors, (not shown), in the combustor 16 after taking into account all the pressure losses in thermal management system 10. Though not necessary, to avoid problems associated with 2-phase flow, this pressure should be above the critical pressure of the fuel. The fuel is now supercritical and flows through a conduit 24 to a preheater 26 in which its temperature is raised to a level at which an endothermic reaction can occur. The particular temperature level depends on the particular fuel, catalyst, and pressure. The drawing depicts the preheater 26 as a component of the compressor 14, however the preheater 26 can be any relatively low temperature heat source such as avionics, the cockpit's environmental control system, or a hollow structural panel on the engine 12. From the preheater 26, the liquid fuel flows through conduit 28 to a first catalytic heat exchanger 30 preferably mounted away from the engine 12.

The heat exchanger 30 has a reactor 32 in heat exchange relation with a heat source 34. The heat exchanger 30 can be a tubular type heat exchanger, or a plate-fin type heat exchanger. In a manner familiar to those skilled in the art, the catalyst can be coated onto a surface, or placed as packed beds in the tubes or plate fin passages of the reactor 32. There being no oxidant present there is no need for buffered heat transfer. The reactor 32 receives the fuel from the conduit 28 and delivers the fuel through conduit 36 to a second engine component 38 that also requires cooling. From the component 38 the fuel returns through conduit 40 to the heat source 34. At this point the fuel exiting the heat source 34 could be sent to another component of the engine, such as 58, and then to the combustor 16. To achieve the full use of the potential heat sink of the endothermic fuel, it is preferred to add a second catalytic heat exchanger 44, also mounted away from the engine 12, and in flow series with the heat exchanger 30.

The heat exchanger 44 has a reactor 46 in heat exchange relation with a heat source 48. A conduit 42 brings the fuel from the heat source 34 to the reactor 46. After leaving the reactor 46, the fuel passes through conduit 50 to another engine component 52 and then through conduit 54 to the heat source 48. A conduit 56 transports the fuel from the heat source 48 to an engine component 58. From the component 58 the fuel flows through a conduit 60 to the combustor 16 where it is ignited. Alternatively, additional catalytic heat exchanger reactors can be added to the thermal management system 10.

Endothermic fuels are combustible fluids which in the presence of a catalyst and heat decompose into two, or more, gaseous compounds, at least one of which is combustible. The endothermic fuel may be selected from a group of hydrocarbon fuels which includes methylcyclohexane (MCH), decalin (hydrogenated naphthalene), methanol, n-heptane, and Jet Propellant(JP) 10. Depending on the fuel selection, the catalyst is selected from a group including platinum, nickel, and zeolite(s). However, the particular selection of fuel and catalyst should not be considered limiting of the invention or the appended claims.

The preferred fuel and catalyst are MCH and platinum. In the presence of heat and platinum, MCH reforms into hydrogen and tolulene, both of which are combustible.

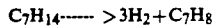

$$C_7H_{14} \longrightarrow 3H_2 + C_7H_8 \qquad (1)$$

In operation, liquid MCH is pumped from the tank 20 to a pressure of about 4.14 MPa (600 psia) which is typically greater than its critical pressure of 3.48 MPa (504 psia). The MCH is now a super critical fluid. Traversing the preheater 26 the fuel adsorbs about 1160 kJ/kg (500 BTU/lbm) of energy raising its temperature a moderate amount to about 665° K. (740° F.). As the fuel passes through the reactor 32 it adsorbs another 1395 kJ/kg (600 BTU/lbm) from the heat source 34 and reacts with the catalyst so that about 40% of the MCH is reformed into tolulene and hydrogen. The fuel and reaction products exit the reactor 32 at a temperature of about 835° K. (1940° F.).

The reaction in the reactor 32 occurs in a relatively narrow temperature band due to the requirements of chemical equilibrium and kinetics, (favored by high temperatures), and catalyst life, (favored by low temperatures). The pressure of the fuel in the reactor 32 is also a factor as low pressures favor the endothermic reaction while high pressures hinder the formation of coke precursors. The selection of the best pressure and temperatures for the reactor depend on the particular fuel and the requirements of the system 10. Therefore, the numbers presented here for MCH are illustrative only.

After leaving the reactor 32, the MCH traverses the engine component 38 adsorbing about 815 kJ/kg (350 BTU/lbm) and exiting at a temperature of about 1055° K. (1440° F.). The presence of hydrogen in the partially reformed MCH, and the use of passivated materials in the component 38 minimizes fuel stability problems. Returning to the heat source 34, 1395 kJ/kg (600 BTU/lbm) is extracted and the fuel is cooled back down to 1055° K. (740° F.). The amount of heat transferred from the heat source 34 to the reactor 32 is limited by temperature limits of the fuel when in contact with the engine components.

The fuel now proceeds to the reactor 46 where the fuel is again reheated to 835° K. (1040° F.) by adsorbing 1395 kJ/kg (600 BTU/lbm) and reforming an additional 40% so that now 80% of the fuel is hydrogen and tolulene. The remaining steps being identical to those that occurred within the heat exchanger 30, until the fuel exits the heat source 48 at a temperature of 1055° K. (740° F.). From here the fuel passes through the engine component 58 where is is reheated and then sent to the combustor 16 where it is ignited.

Thus a thermal management system for supersonic and hypersonic aircraft is provided that uses an endothermic fuel as a heat sink. By using the endothermic fuel, cooling can be accomplished by direct contact of the fuel and the engine components. Further, as the same flow of fuel is used on both sides of the heat exchangers there is no need for gaseous intermediate loops, liquid intermediate loops, or buffered heat exchangers.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A thermal energy management system for a propulsion engine mounted on an aircraft operable at high Mach numbers, said aircraft having a source of endothermic fuel in a liquid state, and said engine having combustor for combusting said endothermic fuel, comprising:
   a preheater receiving a flow of said pressurized endothermic fuel from said source;
   a first reactor receiving said flow from said preheater;
   a first reheater receiving said flow from said first reactor; and
   a first heat source receiving said flow from said first reheater, and delivering said flow to said combustor, said first heat source being in heat exchange relation with said first reactor.

2. The thermal energy management of claim 1 further including a final reheater disposed between said first heat source and said combustor.

3. The thermal energy management of claim 2 further including a pump disposed between said endothermic fuel source and said preheater.

4. The thermal energy management system of claim 3 further comprising:
   a second reactor receiving said flow from said first heat source;
   a second reheater receiving said flow from said second reactor; and
   a second heat source receiving said flow from said second reheater, and delivering said flow to said final reheater, said second heat source being in heat exchange relation with said second reactor.

5. The thermal energy management system of claim 4 wherein said preheater and said reheaters are structural members of said engine requiring cooling.

6. The thermal energy management system of claim 4 wherein said reactors and said heat sources are mounted in said aircraft away from said engine.

* * * * *